United States Patent [19]

Dhawan

[11] Patent Number: 4,705,919
[45] Date of Patent: Nov. 10, 1987

[54] ELECTROSTATIC PATTERN-COUPLED DIGITIZER

[76] Inventor: Satish K. Dhawan, 36 Anita St., New Haven, Conn. 06511

[21] Appl. No.: 704,329

[22] Filed: Feb. 21, 1985

[51] Int. Cl.$^4$ ............................................. G08C 21/00
[52] U.S. Cl. ..................................................... 178/19
[58] Field of Search .............................. 178/18, 19, 20

[56] References Cited

U.S. PATENT DOCUMENTS

| | | | |
|---|---|---|---|
| 3,068,457 | 11/1962 | Nevius | 340/200 |
| 3,593,115 | 7/1971 | Dym | 323/93 |
| 3,699,253 | 10/1972 | Freedman | 178/19 |
| 3,735,044 | 5/1973 | Centner et al. | 178/19 |
| 3,784,897 | 1/1974 | Norrie | 323/93 |
| 3,801,733 | 4/1974 | Bailey | 178/19 |
| 3,819,857 | 6/1974 | Inokuchi | 178/19 |
| 3,860,918 | 1/1975 | Cencel | 340/200 |
| 3,921,165 | 11/1975 | Dym | 340/347 |
| 3,961,318 | 6/1976 | Farrand et al. | 340/200 |
| 3,983,322 | 9/1976 | Rodgers | 178/19 |
| 4,022,971 | 5/1977 | Rodgers | 178/19 |
| 4,029,899 | 6/1977 | Gordon | 178/19 |
| 4,087,625 | 5/1978 | Dym et al. | 178/19 |
| 4,177,421 | 12/1979 | Thornburg | 324/61 |
| 4,210,775 | 7/1980 | Rodgers | 178/19 |
| 4,255,617 | 3/1981 | Carau, Sr. et al. | 178/19 |
| 4,260,852 | 4/1981 | Fencl | 178/19 |
| 4,423,286 | 12/1983 | Bergeron | 178/19 |
| 4,435,616 | 3/1984 | Kley | 178/18 |
| 4,451,698 | 5/1984 | Whetstone et al. | 178/19 |
| 4,488,000 | 12/1984 | Glenn | 178/18 |
| 4,492,818 | 1/1985 | Abe | 178/18 |
| 4,492,819 | 1/1985 | Rodgers | 178/18 |

FOREIGN PATENT DOCUMENTS 1313664 6/1970 United Kingdom .
2015167 9/1979 United Kingdom .

OTHER PUBLICATIONS

"Wedge-and-Strip Anodes for Centroid-Finding Position-Sensitive Photo and Particle Detectors", (H. O. Anger, et al.), Rev. Sci. Instrum. 52 (7), Jul. 1981, pp. 1067-1074.
"A Simple 'Vernier' Method for Improving the Accuracy of Coordinate Readout in Large Wire Chambers", (D. F. Anderson, et al.), Nuclear Instruments and Methods in Physics Research 224, (1984), 315-317.
"Application of the Wedge and Stripe Anode to Position Sensing W/Micro Channel Plates and Proportional Counters", (O. H. W. Sigmund, et al.) IEEE Transactions on Nuclear Science, vol. NS-30, No. 1, Feb. 1983.
"Micro Channel Plate EUV Detectors for the Extreme Ultraviolet Explorer", (O. H. W. Sigmund, et al.) IEEE Transactions on Nuclear Science, vol. NS-31, No. 1, Feb. 1984.
Papers, "Optimization of Wedge and Stripe Anodes", (H. E. Schwartz, et al.).
"Performance of an Imaging Gas Scintillation Proportional Counter with Micro Channel Plate Readout", (Simons, et al.).
"Development of the Penning Gas Imager, (H. E. Schwartz, et al.).

Primary Examiner—Stafford D. Schreyer
Attorney, Agent, or Firm—Parmelee, Bollinger & Bramblett

[57] ABSTRACT

A digitizer in which position of a free moving cursor or stylus over a digitizing surface is determined by electrostatic coupling of the cursor with three coplanar electrodes imbedded in the digitizing tablet. The electrodes consist of a repetitive sawtooth pattern to determine position in one axis, the sawtooths interleaved with progressively wider, repetitive stripes to determine position in another axis. The third electrode covers the remainder of the coplanar surface area. Only three electrode signals are required to be electronically processed to determine absolute vertical and horizontal position of the cursor over the digitizing tablet by a ratiometric measurement. The signals from the electrodes are processed synchronously to reject noise.

27 Claims, 6 Drawing Figures

ELECTROSTATIC PATTERN-COUPLED DIGITIZER

BACKGROUND OF THE INVENTION

This invention relates to a digitizer in which electrostatic coupling between patterned electrodes of a digitizer tablet and a cursor or stylus movable thereon creates signals indicative of the position of the cursor on the tablet.

Devices which are the general subject of this invention are commonly referred to as "digitizers." The earliest digitizers were mechanical devices with restrained arms. Later digitizers have free-moving cursors, and use various forms of coupling phenomenon between a cursor and a digitizing tablet, such as electromagnetic, electrostatic, and even sound coupling. Signals in the tablet have been handled by means of magnetostrictive principles, resistive surfaces, or other conductors, but generally these devices depend upon monitoring of signals introduced in a plurality of X and Y conductors or a resistive film. Since signals from each of the conductors need to be processed individually, or signals from several points on the periphery of a resistive layer, the complexity and cost of this type of digitizer, including its electronics, is high. Thus, there is a need for an improved digitizer.

SUMMARY OF THE INVENTION

A digitizer according to the invention herein comprises a digitizing tablet with a patterned electrode for each coordinate of a two-coordinate system and a cursor with a coupling electrode movable on the tablet, wherein electrical field coupling is utilized to ascertain the position of the cursor on the digitizing tablet. The coordinate system is typically the X-Y coordinate system. The cursor comprises a housing movable on the digitizing tablet, the housing containing a coupling electrode to which an input signal is applied. The coupling electrode electrically field couples to sawtooth and stripe patterned electrodes imbedded in the digitizing tablet. One of the sawtooth or stripe patterned electrodes is used to ascertain X-axis position of the cursor, and the other is used to ascertain Y-axis position of the cursor. The sawtooth and stripe patterned electrodes are conveniently provided coplanar on a printed circuit board and covered with a layer of dielectric material to provide a smooth tablet surface. The signals on the patterned electrodes are processed to ascertain the position of the cursor.

In accordance with more specific aspects of the invention, the digitizer tablet has three coupling electrodes which produce an X-axis signal, a Y-axis signal and a balance signal. The X-axis coupling electrode comprises a plurality of conductive rectangular stripes deployed vertically and arranged in order of increasing width from one side to the other side of the tablet, e.g., increasing in width from the left to the right side of the tablet. The Y-axis coupling electrode comprises a plurality of conductive sawtooths also arranged vertically, with the Y-axis sawtooths interleaved with the X-axis stripes. Movement of the cursor in the X-axis has a negligible effect on the coupling with the Y-axis electrode and movement of the cursor in the Y-axis has negligible effect on coupling with the X-axis electrode. The balance electrode covers the area of the digitizer tablet not covered by the X and Y electrodes. A perimeter shield electrode surrounds the X, Y and balance electrodes, and a planar bottom shield electrode is provided below them, for shielding purposes.

The cursor electrode located in the cursor housing and movable on the surface of the digitizing tablet surface is connected to an oscillator whose frequency typically is in the range of 10 KHZ to 1 MHZ. The cursor electrode couples electrical signals into X-axis, Y-axis and balance electrodes. A shield electrode may be provided in the cursor over the coupling electrode.

The surface area of X-axis electrode coupled with the cursor increases as the cursor is moved or positioned toward the right side of the tablet, where the stripes are wider, and hence more electrical signal is coupled to the X-axis electrode. Similarly, the surface area of the Y-axis electrode coupled with the cursor increases as the cursor is moved downwardly on the tablet, where the sawtooths are thicker, and hence more electrical signal is coupled to the Y-axis electrode. Since X, Y and balance electrodes completely cover the area of the tablet except for small separation spacing, it therefore follows that the sum of the signals on the X-axis, Y-axis and balance electrodes will be independent of cursor position. This sum signal depends primarily upon the amplitude of the oscillator signal, the proximity of cursor electrode to X-axis, Y-axis and balance electrodes and the dielectric constant of the material between the cursor electrode and X-axis, Y-axis and balance electrodes.

The X-axis coordinate of the cursor is proportional to the X-axis signal divided by the sum of X-axis, Y-axis and balance electrode signals. Similarly the Y-axis coordinate of the cursor is proportional to the Y-axis electrode signal divided by the sum of X-axis, Y-axis and balance electrode signals. This ratiometric measurement technique measures accurately the cursor position and is independent of the proximity of the cursor to the digitizer tablet and the dielectric therebetween.

Since the digitizer operates at a single frequency, the electronic processing of the three electrode signals is accomplished by synchronous detection, which results in excellent signal-to-noise ratio; even very high levels of external noise are rejected. Also, since only three signals are utilized, the electronics are relatively simple and inexpensive.

A reversal of the function of the cursor is within the scope of the invention. The input signals may be sequentially applied to the X-axis, Y-axis and balance electrodes, and output signals synchronously detected from the cursor.

The result is an accurate digitizer which can be fabricated at low cost.

OBJECTS OF THE INVENTION

Accordingly, it is a principal object of the invention herein to provide an accurate digitizer.

An additional object of the invention is to provide a digitizer which resists interference.

It is another main object of the invention herein to provide an accurate digitizer of low complexity and cost.

Other and more specific features and objects of the invention will in part be obvious and will in part appear from the following description of the preferred embodiment and claims, taken together with the drawings.

DRAWINGS

The same reference numerals refer to the same elements throughout the various figures.

DESCRIPTION OF PREFERRED EMBODIMENT

Digitizers according to the invention herein generally comprise a digitizer tablet having separate patterned electrodes for each coordinate of a two-coordinate system, and a cursor movable on the surface of the digitizer tablet and including a coupling electrode for establishing electrical field coupling with the patterned electrodes of the digitizer tablet. A signal is applied to the coupling electrode and electrostatically coupled to the patterned electrodes, and the resulting signals on the patterned electrodes are utilized to calculate the coordinates of the cursor position.

A digitizer 10, which is a preferred embodiment of the invention herein, is illustrated in FIGS. 1–6. The digitizer 10 generally comprises a cursor 20, a tablet 40, and electronics 100 for providing an input signal to the cursor and processing output signals from the tablet.

Figure 1:
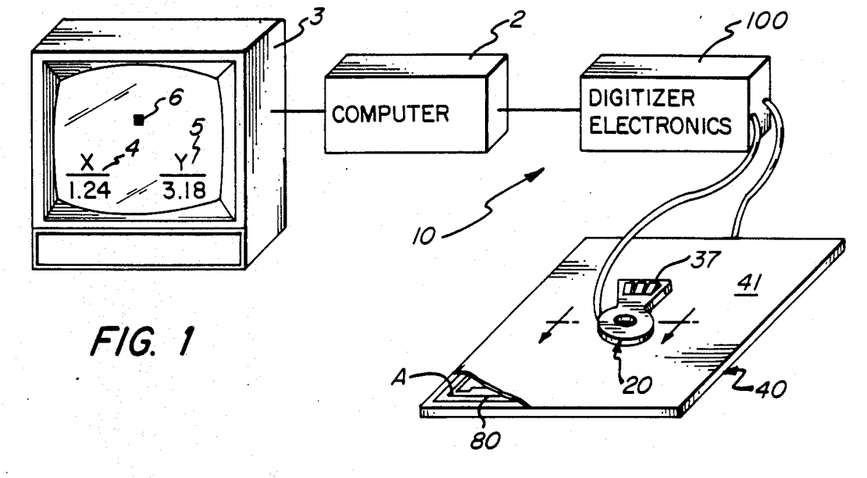
FIG. 1 is a perspective, partially schematic view of a digitizer according to the invention herein being used with a computer system.

As illustrated in FIG. 1, the digitizer 10 is generally used as an input device to a computer 2. The computer 2 generally has a monitor 3 associated therewith, and the monitor 3 may display numeric values of the coordinates representing the position of the cursor 20 on the tablet 40, as indicated at 4 and 5 on the monitor display screen. The monitor may also be used to display a cursor dot, indicated at 6, the position of which on the screen of the monitor is controlled by the position of the cursor on the tablet 40. Thus, the digitizer 10 may perform the function of cursor steering, if desired.

Figure 2:
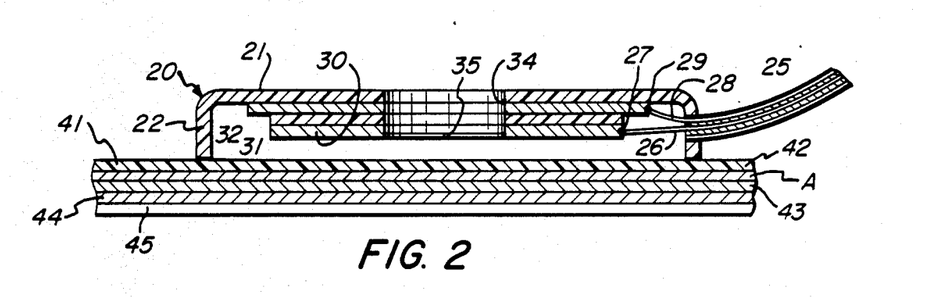
FIG. 2 is a sectional view of the cursor and a portion of the tablet of the digitizer of FIG. 1, taken along the lines 2—2 of FIG. 1.

A cross-sectional view of the cursor 20 and a fragmentary portion of the tablet 40 is shown in FIG. 2. The cursor 20 generally comprises a housing 21 having a depending peripheral side wall 22 which slides on the surface of the digitizer tablet 40. The housing 21 mounts a coupling electrode 30 substantially parallel to the digitizer tablet 40. The coupling electrode is fabricated of metal or other conductive material. The cursor 20 also mounts a ground or shield electrode 32, which is separated from the coupling electrode 30 by a dielectric spacer 31. The shield electrode 32 is preferably somewhat larger than the coupling electrode 30, and overhangs the coupling electrode 30 about its marginal edge.

A cord 25 connects the cursor 20 to the digitizer electronics 100, the cord 25 comprising an input signal wire 26 connected to the coupling electrode at 27 and a coaxial surrounding conductor 28 connected to the shield electrode 32 at 29. The signal is provided to the coupling electrode 30 over the signal wire 26, as will be more fully discussed below.

Figure 5:
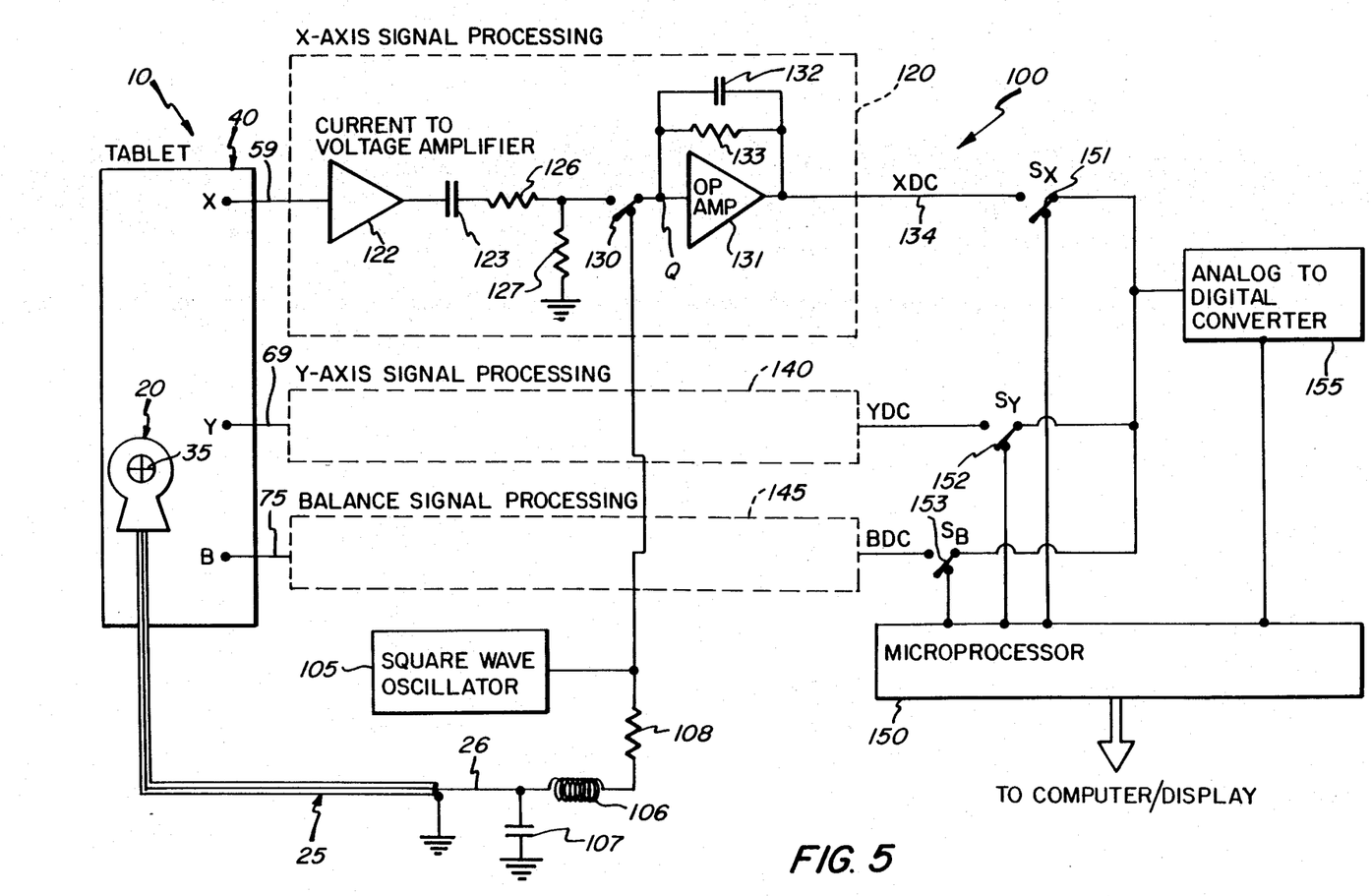
FIG. 5 is a schematic circuit diagram of the digitizer of FIG. 1.

The coupling electrode 30, dielectric spacer 31 and ground electrode 32 may be provided in an annular shape and together with the cover 21 define a central opening 34 in which crosshairs 35 are positioned (See also FIG. 5). The crosshairs assist in positioning the cursor over a specific point, and the crosshairs are centered with respect to the coupling electrode. In any event, the coupling electrode is preferably circular, whereby orientation of the cursor does not affect coupling therefrom.

As seen in FIG. 1, the cursor housing 21 may have a shape which conveniently fits the hand of the user and may be provided with a series of pushbutton switches 37 for communicating with the computer 2 with which the digitizer 10 is used.

The digitizer tablet 40 is generally rectangular and has a planar top surface 41 on which the cursor 20 moves. Positions on the top surface 41 can be expressed as values in a two-dimensional coordinate system, and the coordinate system used in the preferred embodiment is the orthagonal X-Y coordinate system. The digitizer tablet 40 comprises patterned electrodes 50 and 60 which respectively couple with the cursor and provide a signal indicative of the position of the cursor on the digitizer tablet 40. With specific reference to FIG. 2, the digitizer tablet comprises a layer A including the conductive electrodes of the digitizer tablet as are more fully shown and explained in FIGS. 3 and 4. The digitizer tablet 40 includes a top layer 42 of dielectric material, such as polyethylene, ABS plastic, Mylar ® or Teflon ®, covers the electrodes and provides a smooth upper surface of the digitizer tablet. Another layer of dielectric material 43 is provided under the electrode layer A, and separates the electrode layer A from a conductive ground plane 44, which is not essential but is preferably provided as a shield against external noise. A plastic bottom cover 45 completes the digitizer tablet 40. The digitizer tablet 40 is connected to the digitizer electronics by a cable 48, the ground shield of which is connected to the ground plane 44 (not shown) and the other conductors of which are connected as described below.

Figure 3:
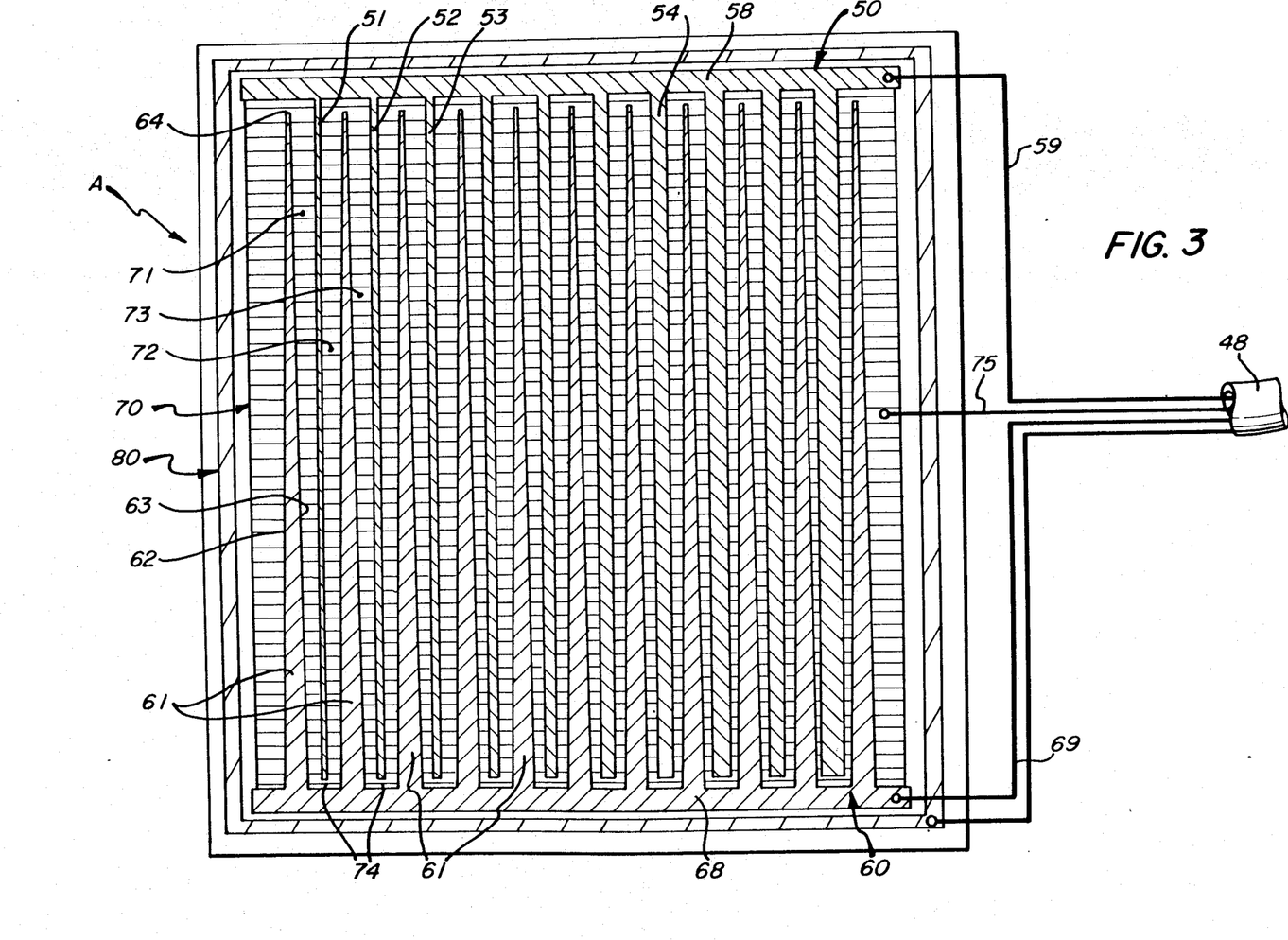
FIG. 3 is a sectional view of the tablet of the digitizer of FIG. 1, taken along the lines 3—3 of FIG. 1.
Figure 4:
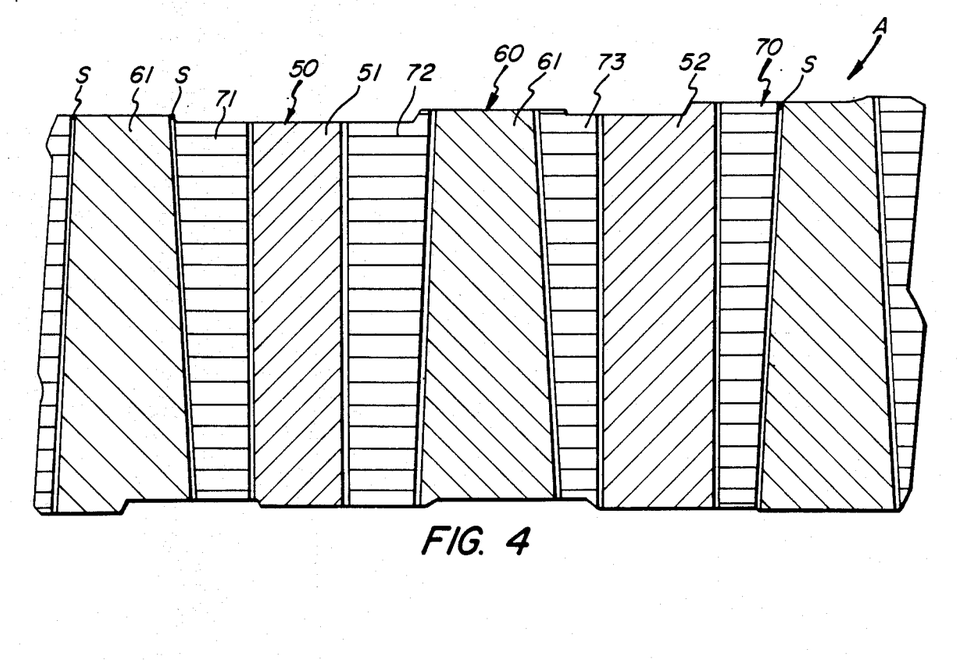
FIG. 4 is an enlarged segment of FIG. 3, showing detail of the tablet.

The electrode layer A of the digitizer tablet 40, a small portion of which is seen in FIG. 1, is best illustrated in FIGS. 3 and 4. The digitizer tablet 40, and particularly electrode layer A thereof, comprises a patterned electrode 50 for the X-axis, a patterned electrode 60 for the Y-axis, and an electrode 70 providing a balance signal. The foregoing electrodes are laid out in a substantially rectangular overall configuration, and are preferably surrounded by a perimeter shield electrode 80.

The X-axis electrode 50 comprises a plurality of stripes, e.g. stripes 51, 52, 53 and 54, which are connected together along one upper edge of the tablet 40 by a X-axis bus 58. The stripes extend downwardly from the bus 58 across most of the tablet. The stripes are parallel to each other and have their center lines evenly spaced apart, but the individual stripes increase progressively in width from one side of the tablet to the other. Thus, the stripe 52 is wider than the adjacent stripe 51, and stripe 53 is wider than adjacent stripe 52. Electrical signal accumulated on the stripes is conducted via the bus 50 to an X-axis signal wire 59 comprising one conductor of the digitizer tablet cable 48.

The Y-axis electrode 60 has a sawtooth pattern with individual sawtooths interleaved with the striped pattern of the X-axis electrode. With continued reference to FIG. 3, the Y-axis electrode comprises a plurality of sawtooths 61 extending substantially across the digitizer tablet 40, the sawtooths 61 being connected together at the edge of the tablet by a Y-axis bus 68. Each individual sawtooth 61 comprises a elongated, narrow area of the Y-axis electrode 60, having edges 62 and 63 which converge as the sawtooth extends from the bus portion 68 to a narrow, terminal end 64 adjacent the X-axis bus conductor 58. The sawtooths 61 are evenly spaced apart, and are spaced intermediate adjacent stripes. The Y-axis electrode 60 has its bus 68 connected to the digitizer electronics 100 via conductor 69 which is a portion of cable 48.

The electrode layer A of the digitizer tablet 40 further comprises a balance electrode 70, which covers the surface of the electrode layer which remains between the stripes and sawtooths of the X-axis and Y-axis patterned electrodes. Again with reference to FIG. 3, the balance electrode 70 takes the form of elongate legs, e.g. legs 71, 72 and 73, wherein leg 71 and 72 flank X-axis stripe 51, and legs 72 and 73 flank the next adjacent sawtooth 61. The legs of the balance electrodes are connected adjacent the X-axis bus 50 and the Y-axis bus 68, e g. legs 71 and 72 are connected at 74, between the end of stripe 51 and the Y-axis bus 68. The balance electrode has conductor 75, comprising a portion of cable 48, for connecting it into the digitizer electronics 100.

The electrode layer A further comprises a shield electrode 80, which is deployed about the perimeter of the X-axis, Y-axis and balance electrodes. The shield electrode 80 may be connected to the shield of the cable 48, as indicated in FIG. 3.

The digitizer tablet, of course, has a useful surface confined to the area of the stripes and sawtooths, respectively, of the X-axis and Y-axis electrodes, and the useful digitizing surface does not include the X-axis and Y-axis buses nor the perimeter shield electrode.

There is separation between the electrodes, so that they are separately conducting. This space is best illustrated in FIG. 4, which is an enlarged fragmentary view of the electrode layer A shown in FIG. 3. With more particular reference to FIG. 4, there are shown sawtooths 61 of the Y-axis electrode 60, stripes 51, 52 of the X-axis electrode 50, and legs 71, 72 and 73 of the balance electrode 70. A small amount of spacing, indicated by the letter S, is provided between all of the adjacent electrode edges.

It will be appreciated that even FIG. 3 is shown very much enlarged and schematically for purposes of illustration, and that the actual stripes, sawtooths, and their spacing are much more fine than are shown in the Figure. In a preferred embodiment, there may be approximately five X-axis pattern stripes and five Y-axis pattern sawtooths per inch. The amount of increase in width from one X-axis stripe to the adjacent X-axis stripe, may be approximately 0.001 inches.

It will further be appreciated that the coupling electrode 30 of the cursor 20 is sized and spaced from the tablet such that its field covers a plurality of stripes and sawtooths, preferably at least five. Thus, several elements of the patterned electrodes are coupled to the cursor at any given time, so that the position of the cursor with respect to any individual element is not a factor in the resultant signal.

It should also be appreciated at this time that a stylus of the type comprising an electrode in the shape of a ring or other suitable shape surrounding a pointer of pen-like shape may be used in place of the cursor, if desired, provided the stylus electrode is sufficiently spaced from the tablet electrodes to spread electrical field coupling between the stylus and the tablet electrodes, thereby achieving an averaging effect with respect to any particular stripe or sawtooth element.

The X-axis electrode 50, Y-axis electrode 60, balance electrode 70 and shield electrode 80 may comprise copper, silver, conductive ink or any other conductor deposited on a printed circuit board material, wherein the printed circuit board material comprises the dielectric layer 43 of the digitizer tablet 40. Other fabrication techniques are also useful, including printing the electrodes in conductive ink on a thin film of Mylar ® or similar material, and affixing the film with the electrodes printed thereon to either the dielectric layer 43 or the top dielectric layer 42 of the digitizer tablet 40.

One advantage of the digitizer according to the invention herein is that it does not depend upon accurate resistivity of the conductive elements, whereby a certain amount of variation in the thickness of the conductive electrodes does not produce error in the output of the digitizer. This permits less expensive fabricating techniques to be used in preparing the digitizer tablet.

Figure 6:
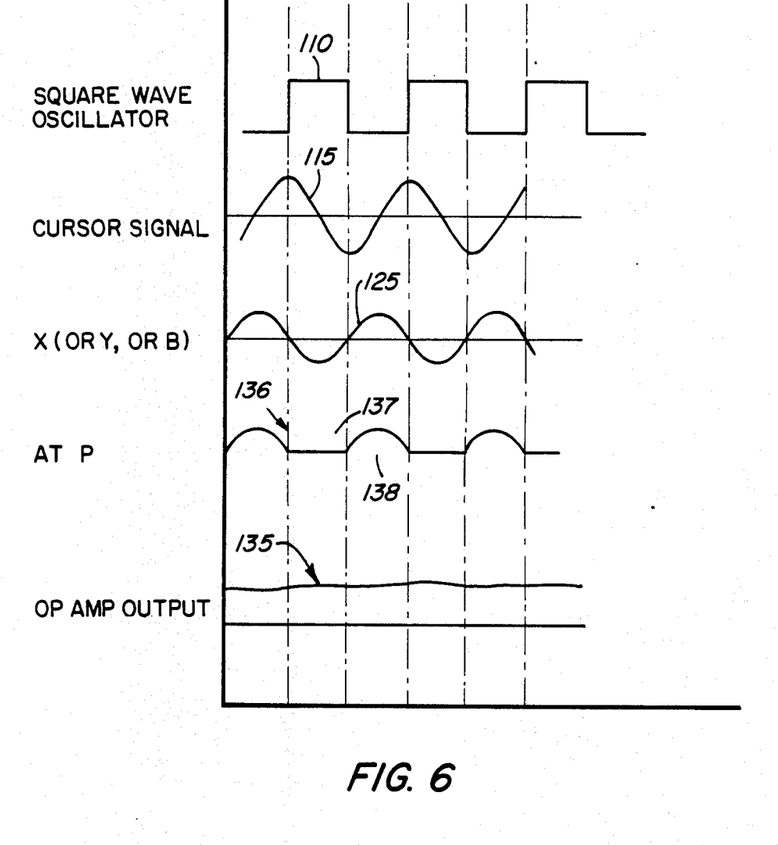
FIG. 6 is a graph showing operation of the circuit of FIG. 5.

The digitizer 10 operates by electrostatic coupling between the coupling electrode 30 of the cursor 20 and the patterned X-axis electrode 50, the patterned Y-axis electrode 60 and the balance electrode 70 of the digitizer tablet 40. In the preferred embodiment, an input signal is provided to the cursor, coupled to the electrodes of the tablet, and the resultant signals on the tablet electrodes are processed to determine an X-axis coordinate and Y-axis coordinate of cursor position on the tablet. With reference to FIGS. 5 and 6, the electronic operation of the digitizer 10 is illustrated. With reference first to FIG. 5, the cursor 20 is shown positioned on the digitizer tablet 40 at the left hand side of the figure. The cursor 20 and tablet 40 are shown schematically, and in particular the tablet would generally be less elongated and the cursor would be smaller with respect to the tablet. The right hand portion of FIG. 5 generally comprises the electronics package 100 of the digitizer 10.

The X coordinate is given by the signal coupled from the cursor to the variable width stripe patterned X-axis electrode. The Y coordinate is given by the signal coupled by the cursor to the sawtooth patterned Y-axis electrode. The balance electrode provides a third signal, referred to as the "B" signal below. The sum of the signals from the X-axis, Y-axis and balance electrodes gives the strength or magnitude of the total signal coupled from the cursor. The absolute X-axis and Y-axis coordinates are given by:

X coordinate proportional to $X/X+Y+B$;
Y coordinate proportional to $Y/X+Y+B$;
where "X" equals the X-axis signal, "Y" equals the Y-axis signal and "B" equals the balance signal. This ratiometric measurement technique eliminates the error otherwise caused by variation in distance between the cursor and the digitizing tablet.

Again with reference to FIG. 5, the electronics 100 for carrying out the ratiometric measurement comprise a square wave oscillator 105 providing a square wave output signal 110 (FIG. 6) at a fixed frequency, preferably in the range of 10 KHZ to 1 MHZ. The square wave oscillator 105 drives a tuned LC circuit comprised of inductor 106 and capacitor 107, with the output signal of the square wave oscillator passing through a resistor 108 for limiting the loading on the oscillator. The tuned circuit elements 106 and 107 provide a multiple voltage gain to drive the coupling electrode 30 through conductor 26 of cable 25. The cursor signal is shown at 115 in FIG. 6, and is phase shifted 90° from the oscillator output by operation of the LC circuit.

The signal on the coupling electrode 30 electrical field couples to the X-axis, Y-axis and balance electrodes of the digitizer tablet 40, with the strength of the signal coupled to the X-axis and Y-axis electrodes being dependent upon the position of the cursor on the tablet 40. More particularly, in accordance with the arrangement of the electrodes illlustrated, a greater Y-axis signal is provided when the cursor is near the lower edge of the tablet, where the sawtooths of the Y-axis patterned electrode are wider. Similarly, the X-axis signal is larger for cursor positions toward the right hand side of the tablet, where the stripes of the X-axis patterned electrode are wider.

The signals from the X-axis, Y-axis and balance electrodes are provided on conductors 59, 69 and 75, respectively, and these signals are processed as also illustrated in FIGS. 5 and 6. The X-axis signal processing is indicated generally at 120, and it will be appreciated that the Y-axis signal processing 140 and balance signal processing 145 are similar and showing them would be merely repetitious.

The signal from the X-axis electrode, provided on conductor 59, is amplified by the current-to-voltage amplifier 122 to produce signal 125 shown in FIG. 6. This signal is phase-shifted another 90° from the oscillator, because of the coupling. The amplified signal goes through a high pass filter comprised of capacitor 123 and resistors 126 and 127 to reject any 60 cycle line frequency noise. This filtered AC signal is synchronously switched at the frequency of the square wave oscillator 105 by switch 130, the filtered AC signal being applied through switch 130 as the input to an operational amplifier 131.

An important feature of the signal processing in the digitizer 10 according to the invention herein is the synchronous processing of the X-axis, Y-axis and balance electrode signals. In the X-axis signal processing 120 shown, the X-axis signal is provided to the operational amplifier 131 through switch 130 operated at the frequency of the square wave oscillator 105, which is also generating the input signal to the cursor. This synchronous processing of the signals rejects noise or other pickup at all other frequencies, resulting in a very high signal to noise ratio and improved accuracy in the determination of the coordinate position of the cursor on the digitizer tablet 40.

Capacitor 132 and resistor 133 act as a filter to reduce AC ripple on the output of the operational amplifier 131, whereby a stable voltage signal indicative of the X-axis position of the cursor is produced on line 134 labeled "XDC". With reference to FIG. 6, the X-axis signal at point P, is shown at 136, and comprises a positive portion shown at 137 which is pulled to virtual ground, as shown at 138 when switch 130 is closed. Point Q, at the input of the operational amp 131 is also maintained at virtual ground by the feed back through capacitor 132 and resistor 133. The voltage gain is mainly determined by the ratio of the value of resistor 133 over the value of resistor 126, and the output of operational amplifier 131 is as noted above, a DC signal having a value indicative of the X-axis position of the cursor on the tablet 40. The output of the X-axis signal processing electronics 120 is shown at 135 in FIG. 6.

The Y-axis electrode and balance electrode signals are processed similarly.

The outputs of the X-axis signal processing 120, the Y-axis signal processing 140 and the balance signal processing 145 are further processed in a microprocessor 150. More particularly, the signals are converted from analog to digital values via an analog-to-digital converter 155, which operates on the signals sequentially by means of switches 151, 152 and 153 which are also operated by the microprocessor. The rate of sampling may coincide with the report rate of the microprocessor to the computer 2, typically 10 to 120 HZ. The microprocessor calculates the position of the cursor in accordance with the ratiometric measurement technique and formula set forth above, and provides the position to the computer 2 for use and/or display.

Alternatively, the digitizer tablet can also be operated by sequentially inputting signal to the X-axis, Y-axis and balance electrodes, and utilizing the cursor electrode as the output electrode. The operation in this mode is also carried out synchronously, both to achieve high signal to noise ratio and also to maintain the necessary distinction between the three signals being handled.

Accordingly, there has been described an improved digitizer which admirably achieves the objects of the invention herein. It will be appreciated by those skilled in the art that various changes can be made from the preferred embodiments described above without departing from the spirit and scope of the invention, which is limited only by the following claims.

Having thus described the invention, what is claimed is:

1. A digitizer comprising:
   A. a digitizer tablet having two electrodes, the first electrode having a pattern that varies with a first coordinate in a two-coordinate system and the second electrode having a pattern that varies with the second coordinate in the two-coordinate system;
   B. a cursor movable on the digitizer tablet, the cursor including a coupling electrode for electrostatic field coupling with the first and second patterned electrodes of the digitizer tablet;
   C. signal generating means connected for inputting an electrical signal to the coupling electrode of the cursor, thereby establishing electrostatic field coupling with and electrical signals on each of the first and second patterned electrodes, the electrical signals on the first and second patterned electrodes being indicative of the position of the cursor in the two-coordinate system; and
   D. electronic means for calculating the coordinates of the cursor in the two-coordinate system from the electrical signals on the first and second patterned electrodes.

2. A digitizer as defined in claim 1 wherein the first and second patterned electrodes are coplanar.

3. A digitizer as defined in claim 2 wherein the two-coordinate system is the orthogonal X-Y axis coordinate system and one of the first and second patterned electrodes comprise a plurality of conductive stripes connected together along one end, the stripes having progressively increasing width starting from a side of the tablet and extending toward an opposite side of the tablet, and the other patterned electrode comprises a plurality of elongated sawtooths interleaved between the stripes, the sawtooths also being connected together at one end thereof, whereby one of the patterned electrodes provides an X-axis indicating signal and the other patterned electrode provides a Y-axis indicating signal.

4. A digitizer as defined in claim 3 and further comprising a balance electrode coplanar with the stripe and sawtooth patterned electrodes and occupying the space therebetween, whereby the sum of the stripe, sawtooth and balance electrodes constitutes the total output signal of the digitizer tablet and the X-axis coordinate of the cursor is proportional to the X-axis signal divided by the sum of the stripe, sawtooth and balance electrodes, and the Y-axis coordinate position is proportional to the Y-axis signal divided by the sum of the stripe, sawtooth and balance electrode signals.

5. A digitizer as defined in claim 4 wherein the field of the coupling electrode of the cursor is circular and covers at least four stripes and sawtooths.

6. A digitizer as defined in claim 4 wherein the coupling electrode of the cursor has a central opening transparent to the tablet surface, in which a mark indicates the center of the coupling electrode.

7. A digitizer as defined in claim 5 wherein the tablet further comprises a perimeter shield electrode coplanar with and surrounding the stripe, sawtooth and balance electrodes, for shielding them against interference.

8. A digitizer as defined in claim 5 wherein the cursor further comprises a shield electrode positioned on the opposite side of the cursor coupling electrode from the digitizer tablet and separated from the cursor coupling electrode by a dielectric spacer, for shielding the cursor coupling electrode from interference.

9. A digitizer as defined in claim 8 wherein the cursor shield electrode is larger than and overhangs the cursor coupling electrode.

10. A digitizer as defined in claim 9 wherein the digitizer tablet further comprises a planar ground electrode positioned on the opposite side of the stripe, sawtooth and balance electrodes from the cursor coupling electrode and separated from the stripe, sawtooth and balance electrodes by a dielectric layer of the digitizer tablet.

11. A digitizer as defined in claim 4 wherein the stripes of the stripe patterned electrode are evenly spaced apart and progressive increase of the width of the stripe electrodes is approximately 0.001 inch, and the sawtooths of the sawtooth patterned electrode are evenly spaced apart.

12. A digitizer as defined in claim 11 wherein there are at least four each striped and sawtooth electrodes per inch.

13. A digitizer as defined in claim 4 wherein the digitizer tablet comprises first and second layers of dielectric material with the first and second patterned electrodes and the balance electrode therebetween.

14. A digitizer as defined in claim 13 wherein the first and second patterned electrodes and the balance electrode comprise a conductive material deposited on one of the first or second layers of dielectric material.

15. A digitizer as defined in claim 13 wherein the first and second patterned electrodes and the balance electrode comprise a conductive ink printed on a thin film of dielectric material and said film is deployed between the first and second layers of dielectric material.

16. A digitizer as defined in claim 13 and further comprising a perimeter shield electrode surrounding the first and second patterned electrodes and the balance electrode, the perimeter shield electrode being positioned between the first and second layers of dielectric material.

17. A digitizer as defined in claim 13 wherein the first layer of dielectric comprises the top surface of the digitizer tablet on which the cursor is used, and further comprising a ground plane electrode substantially covering the second dielectric on the opposite side from the first and second patterned electrodes and the balance electrode.

18. A digitizer as defined in claim 4 wherein the input to the cursor coupling electrode is an alternating current electrical signal, and the electrical output signals from the stripe, sawtooth and balance electrodes are also alternating signals at the same frequency, wherein the output signals from the stripe, sawtooth and balance electrodes are detected synchronously with the input signal, thereby minimizing interference and providing a high signal-to-noise ratio in the output of the digitizer tablet.

19. A digitizer as defined in claim 18 wherein the frequency of the input signal is in the range of 10 KHZ to 1 MHZ.

20. A digitizer comprising:
A. a digitizer tablet having two electrodes, the first electrode having a pattern that varies with a first coordinate in a two-coordinate system and the second electrode having a pattern that varies with the second coordinate in the two-coordinate system;
B. a cursor movable on the digitizer tablet, the cursor including a coupling electrode for coupling with the first and second patterned electrodes of the digitizer tablet;
C. signal generating means connected for inputting an electrical signal alternately to the first and second patterned electrodes of the digitizer tablet, thereby establishing electrostatic field coupling with and an electrical signal on the coupling electrode of the cursor, the signal on the cursor coupling electrode being alternately indicative of the position of the cursor in each coordinate of the two-coordinate system; and
D. electronic means for calculating the coordinates of the cursor in the two-coordinate system from the signals coupled to the cursor electrode from the first and second patterned electrodes.

21. A digitizer as defined in claim 20 wherein the first and second patterned electrodes are coplanar.

22. A digitizer as defined in claim 21 wherein the two-coordinate system is the orthogonal X-Y axis coordinate system and one of the first and second patterned electrodes comprises a plurality of conductive stripes connected together along one end, the stripes having progressively increasing width starting from a side of the tablet and extending toward an opposite other side of the tablet, and the other a plurality of elongated sawtooths interleaved between the stripes, the sawtooths also being connected together at one end thereof, whereby one of the patterned electrodes provides an X-axis indicating signal to the cursor coupling electrode and the other patterned electrode provides a Y-axis indicating signal to the cursor coupling electrode.

23. A digitizer as defined in claim 22 and further comprising a balance electrode coplanar with the stripe and sawtooth patterned electrodes and occupying the space therebetween, whereby the sum of the stripe, sawtooth and balance electrodes constitutes the total output signal of the digitizer tablet and the X-axis coordinate of the cursor is proportional to the X-axis signal divided by the sum of the stripe, sawtooth and balance electrodes, and the Y-axis coordinate position is proportional to the Y-axis signal divided by the sum of the stripe, sawtooth and balance electrode signals.

24. A digitizer as defined in claim 23 wherein the input to the first and second patterned electrodes and balance electrode is an alternating current electrical signal, and the electrical output signals from the cursor coupling electrode are also alternating signals at the same frequency, wherein the output signals from the cursor coupling electrode are detected synchronously with the input signals, thereby minimizing interference and providing a high signal-to-noise ratio in the output of the digitizer tablet.

25. A digitizer comprising:
A. a digitizer tablet having two electrodes, the first electrode having a pattern that varies with a first coordinate in a two-coordinate system and the second electrode having a pattern that varies with the second coordinate in the two-coordinate system;
B. a stylus movable on the digitizer tablet, the stylus including a coupling electrode for electrostatic field coupling with the first and second patterned electrodes of the digitizer tablet;
C. signal generating means connected for inputting an electrical signal to the coupling electrode of the stylus, thereby establishing electrostatic field coupling with and electrical signals on each of the first and second patterned electrodes, the electrical signals on the first and second patterned electrodes being indicative of the position of the stylus in the two-coordinate system; and
D. electronic means for calculating the coordinates of the stylus in the two-coordinate system from the electrical signals on the first and second patterned electrodes.

26. A digitizer comprising:
A. a digitizer tablet having two electrodes, the first electrode having a pattern that varies with a first coordinate in a two-coordinate system and the second electrode having a pattern that varies with the second coordinate in the two-coordinate system;
B. a stylus movable on the digitizer tablet, the stylus including a coupling electrode for coupling with the first and second patterned electrodes of the digitizer tablet;
C. signal generating means connected for inputting an electrical signal alternately to the first and second patterned electrodes of the digitizer tablet, thereby establishing electrostatic field coupling with and an electrical signal on the coupling electrode of the stylus, the signal on the stylus coupling electrode being alternately indicative of the position of the stylus in each coordinate of the two-coordinate system; and
D. electronic means for calculating the coordinates of the stylus in the two-coordinate system from the signals coupled to the stylus electrode from the first and second patterned electrodes.

27. A digitizer as defined in claim 26 wherein the first and second patterned electrodes are coplanar.

* * * * *